United States Patent

Kimura et al.

[11] Patent Number: 5,922,164
[45] Date of Patent: *Jul. 13, 1999

[54] POLYESTER FILM FOR THERMAL LAMINATION

[75] Inventors: Masahiro Kimura, Otsu; Hideyuki Yamauchi, Kusatsu; Kenji Tsunashima; Shiro Imai, both of Kyoto, all of Japan

[73] Assignee: Toray Industries, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/920,134

[22] Filed: Aug. 27, 1997

Related U.S. Application Data

[63] Continuation of application No. 08/284,475, filed as application No. PCT/JP93/01765, Dec. 3, 1993, abandoned.

[30] Foreign Application Priority Data

| Apr. 12, 1992 | [JP] | Japan | 4-325451 |
| Mar. 16, 1993 | [JP] | Japan | 5-055907 |
| Aug. 19, 1993 | [JP] | Japan | 5-205270 |

[51] Int. Cl.$^6$ .......... B32B 15/08; B32B 27/36; B32B 31/14; B32B 31/20
[52] U.S. Cl. .......... 156/308.2; 428/35.8; 428/141; 428/212; 428/458; 428/480; 528/283; 528/308
[58] Field of Search .......... 428/35.8, 35.7, 428/35.9, 458, 480, 141, 212; 528/308, 308.1, 308.3, 308.6, 308.7, 308.8, 283; 525/437, 447; 156/308.2, 297, 298

[56] References Cited

U.S. PATENT DOCUMENTS

| 3,795,639 | 3/1974 | Chimura et al. | 260/2.3 |
| 3,830,759 | 8/1974 | Barkey | 260/75 R |
| 3,984,379 | 10/1976 | Oka et al. | 260/75 M |
| 4,362,775 | 12/1982 | Yabe et al. | 428/213 |
| 5,093,208 | 3/1992 | Heyes et al. | 428/623 |
| 5,149,389 | 9/1992 | Heyes et al. | 156/272.4 |
| 5,243,022 | 9/1993 | Kim et al. | 528/308.8 |
| 5,292,471 | 3/1994 | Ito et al. | 264/171 |
| 5,302,686 | 4/1994 | Tanaka et al. | 428/35.7 |
| 5,318,648 | 6/1994 | Heyes et al. | 156/244.24 |

FOREIGN PATENT DOCUMENTS

| 53-73288 | 6/1978 | Japan . |
| 1-192546 | 8/1989 | Japan . |
| 4-261826 | 9/1992 | Japan . |
| WO-A-93 22367 | 11/1993 | WIPO . |

OTHER PUBLICATIONS

Kazuo Yugi et al., eds., *Saturated Polyester Resins Handbook*, pp. 153–159 and 586–595, Nikkan Kogyo Shinbun (1989).

Derwent publications Ltd., London, GB; Section Ch, Week 8536, Class A23, AN 85–219511, XP002018107.

*Primary Examiner*—Vivian Chen
*Attorney, Agent, or Firm*—Morrison & Foerster

[57] ABSTRACT

A method of thermally laminating a substrate with a polyester film characterized in that said film has a melting point of 150–250° C., contains 0.01–1% by weight of diethylene glycol component and not more than 0.8% by weight of cyclic trimers, and has an intrinsic viscosity [η] of not less than 0.7. The film has good formability and physical properties such as impact resistance, which are hitherto not attained, and the film is excellent in adhesiveness and taste characteristics, so that the film is suited as a wrapping material and as an inner liner of containers.

12 Claims, No Drawings

POLYESTER FILM FOR THERMAL LAMINATION

This application is a 371 of PCT/JP93/01765 filed Dec. 3, 1993, which is a continuation of application Ser. No. 08/284,475, filed Aug. 4, 1994, now abandoned.

TECHNICAL FIELD

The present invention relates to a polyester film for thermal lamination which excels not only in adhesiveness and impact resistance, but also in shapability and taste characteristics. More particularly, the present invention relates to a polyester film for thermal lamination suited for metal cans produced by forming.

BACKGROUND ART

The term "thermal lamination" with a film in the present invention means to laminate the film on a substrate such as a metal or a non-metal (paper, plastics, fibers, non-woven fabric or the like) wherein the substrate or the film is heated to continuously adhere the both to form a composite.

Particularly, methods for laminating a film on a metal plate are drawing attention with the recent increase in the production of metal cans.

Conventionally, in order to prevent corrosion of inner surface of metal cans, it is widely performed to apply solutions or dispersions of various thermosetting resins such as epoxy resins and phenol resins in a solvent to the inner surface of metal cans to coat the inner surface. However, with this method by which the inner surface is coated with a thermosetting resin, a long time is required for drying the coating liquid, so that the production efficiency is low. Further, environmental pollution by the large amount of organic solvents is problematic.

To overcome these problems, a polyester film is laminated on a steel plate, aluminum plate or on a steel or aluminum plate whose surface is treated in wide variety of manners such as plating, and a metal can is prepared from the metal plate laminated with the film by drawing or ironing. The following characteristics are demanded for the polyester film:

(1) The film has a good adhesion to a metal plate.
(2) The film has a good shapability and voids such as pin holes are not formed after being shaped.
(3) The polyester film is not peeled off and cracks and pin holes are not formed in the film by an impact to the metal can.
(4) Smelling components of the content in the can are not adsorbed by the polyester film, and the taste of the content is not deteriorated by a component eluted from the polyester film (This property is hereinafter referred to as "taste characteristics").

To satisfy these demands, a number of proposals have been made. For example, Japanese Laid-open Patent Application (Kokai) No. 2-305827 discloses a polyester film having a specific coefficient of planar orientation, and Japanese Laid-open Patent Application (Kokai) No. 2-57339 discloses a copolymerized polyester film having a specific crystallinity. However, by these proposals, the above-mentioned wide variety of demands cannot be simultaneously satisfied. Particularly, it is difficult to simultaneously attain good shapability and good impact resistance, and the taste characteristics are unsatisfactory. Especially, in the ironing, since the film is drawn at a ratio of about 200–300%, it is difficult to attain good characteristics with the above-described conventional films.

Further, when the film is thermally laminated with a substrate other than metal, it is difficult to obtain a composite which satisfies good adhesion, impact resistance and taste characteristics. In particular, with the container having paper and on olefin-based polymer laminated on the paper, the taste characteristics are extremely bad.

DISCLOSURE OF THE INVENTION

An object of the present invention is to overcome the above-described problems and to provide a polyester film for thermal lamination having excellent shapability, adhesiveness, impact resistance and taste characteristics. Particularly, it is an object of the present invention to provide a polyester film for thermal lamination suited for metal cans produced by forming.

The above-mentioned objects of the present invention can be attained by providing a polyester film for thermal lamination characterized in that said film has a melting point of 150–250° C., contains 0.01–1% by weight of diethylene glycol component and has an intrinsic viscosity [η] of not less than 0.7.

BEST MODE FOR CARRYING OUT THE INVENTION

The term "polyester" herein means polymers consisting essentially of a dicarboxylic acid component and a glycol component. Examples of the dicarboxylic acid component include aromatic dicarboxylic acids such as terephthalic acid, isophthalic acid, naphthalene dicarboxylic acid, diphenyldicarboxylic acid, diphenylsulfone dicarboxylic acid, diphenoxyethane dicarboxylic acid, 5-sodiumsulfoisophthalic acid and phthalic acid; aliphatic dicarboxylic acids such as oxalic acid, succinic acid, adipic acid, sebacic acid, dimer acid, maleic acid and fumaric acid; alicyclic dicarboxylic acids such as cylohexane dicarboxylic acid; and oxycarboxylic acids such as p-oxybenzoic acid. Among these dicarboxylic acid components, terephthalic acid, isophthalic acid and naphthalene dicarboxylic acid are preferred in view of the impact resistance and taste characteristics. On the other hand, examples of the glycol components include aliphatic glycols such as ethylene glycol, propanediol, butanediol, pentanediol, hexanediol and neopentyl glycol; alicyclic glycols such as cyclohexanedimethanol; and aromatic glycols such as bisphenol A and bisphenol S. Among these glycol components, ethylene glycol is preferred in view of the impact resistance and taste characteristics. Two or more of these dicarboxylic components and/or two or more of these dicarboxylic components may be employed in combination.

As long as the effects of the present invention are not adversely affected, polyfunctional compounds such as trimellitic acid, trimesic acid and trimethylolpropane may be copolymerized in the polyester.

It is required that the polyester used in the present invention have a melting point of 150–250° C. to attain good heat resistance and adhesiveness with the metal plate. Preferred polyesters satisfying this requirement include polyethylene terephthalates and polyethylene isophthalates as well as copolymers thereof. In cases where one or more of the above-mentioned acid components and/or glycol components is copolymerized with polyethylene terephthalate or polyethylene isophthalate, the amount of the component to be copolymerized is preferably 1–40 mol %, more preferably 5–30 mol %, still more preferably 8–20 mol % with respect to the total acid components and/or glycol components, in view of the adhesiveness with the metal plate. If the amount of the copolymerized component is less than 1 mol %, the adhesiveness with the metal plate is not good and the crystallization of the film is promoted during the production process of the metal can, so that the film may be peeled off and the impact resistance is poor. On the other hand, if the amount of the copolymerized component is more than 40 mol %, the melting point is low, so that the impact resistance is poor. Preferred copolymerized components include isophthalic acid and butanediol. Isophthalic acid is especially preferred.

To promote the impact resistance, it is important to control the amount of diethylene glycol produced as a byproduct during the production of the polyester. In the present invention, it is necessary to control the amount of diethylene glycol within the range of 0.01–1% by weight, preferably 0.01–0.8% by weight, still more preferably 0.01–0.6% by weight, still more preferably 0.01–0.5% by weight, by the method described below. To make the amount of the diethylene glycol component to be less than 0.01% by weight necessitates complicated polymerization process and so it is not preferred in view of the cost. On the other hand, if it is more than 1% by weight, due to the thermal history of the can-forming process, the polyester is deteriorated so that the impact resistance of the film is largely reduced, which is not preferred. The diethylene glycol is produced as a byproduct during the production of the polyester. The method for making the amount of the diethylene glycol to not more than 1% by weight is not restricted, and may be accomplished by a method in which the amount of antimony compound or germanium compound used as a polymerization catalyst is limited; a method in which liquid phase polymerization and solid phase polymerization are combined; and by a method in which an alkaline metal such as sodium is added to the polymerization system.

To improve the impact resistance and taste characteristics according to the present invention, it is necessary that the intrinsic viscosity [η] be not less than 0.7. It is thought that if the intrinsic viscosity is large, the probability that molecules intertwine is increased, so that not only the impact resistance is promoted but also the adsorption of smelling components is hindered.

Here, the intrinsic viscosity [η] was determined by dissolving the polymer in o-chlorophenol and measuring the relative viscosity at 25° C.

The intrinsic viscosity is preferably not less than 0.80, still more preferably not less than 0.82, because the impact resistance is further promoted.

To improve the taste characteristics, it is preferred to make the content of acetoaldehyde in the polyester be not more than 50 ppm, more preferably not more than 40 ppm, still more preferably not more than 30 ppm, still more preferably not more than 20 ppm. If the content of acetoaldehyde is more than 50 ppm, the taste characteristics are poor. The method for making the acetoaldehyde content in the film be not more than 50 ppm is not restricted. Examples of such methods include a method in which the polyester is heated at a temperature lower than the melting point of the polyester under reduced pressure or under an inert gas atmosphere to remove acetoaldehyde generated by thermal decomposition during the formation of the polyester by polycondensation or the like; a method in which the polyester is prepared by solid phase polymerization under reduced pressure or under an inert gas atmosphere at a temperature of not lower than 150° C. and not higher than the melting point; a method in which the polyester is made into a film by melt-extrusion by using a vent type extruder; and a method in which the polyester is melt-extruded at a temperature not higher than melting point +40° C., preferably not higher than melting point +30° C. in a short time. These methods are effective as the method for obtaining a film having a high intrinsic viscosity.

To obtain a film having a high intrinsic viscosity, it is preferred to make the water content in the polyester chip be not more than 100 ppm, more preferably not more than 50 ppm, still more preferably not more than 30 ppm.

In view of the taste characteristics, the polyester according to the present invention preferably contains germanium element in an amount of 1–500 ppm, more preferably 5–300 ppm, still more preferably 10–100 ppm. If the amount of the germanium element is less than 1 ppm, the effect of improving the taste characteristics is not sufficient, and if it is more than 500 ppm, foreign matter is generated in the polyester, so that the impact resistance and taste characteristics are deteriorated. By incorporating the above-mentioned specific amount of germanium element in the polyester according to the present invention, the taste characteristics can be promoted. Although the method for incorporating germanium element in the polyester is not restricted, it is preferred to add a germanium compound as a polymerization catalyst usually at an arbitrary step before completion of the production of the polyester. Examples of such a method include a method in which powder of a germanium compound is directly added; and a method in which a germanium compound is dissolved in the glycol component which is a starting material of the polyester, as described in Japanese Patent Publication (Kokoku) No. 54-22234. Examples of the germanium compound include germanium dioxide; germanium hydroxide containing crystal water; germanium alkoxide compounds such as germanium tetramethoxide, germanium tetraethoxide, germanium tetrabutoxide and germanium ethyleneglycoxide; germanium phenoxides such as germanium phenolate and germanium β-naphtholate; phosphorus-containing germanium compounds such as germanium phosphate and germanium phosphite; and germanium acetate. Among these, germanium dioxide is preferred.

In view of the impact resistance and taste characteristics, it is preferred to make the amount of the terminal carboxyl groups of the polyester film according to the present invention be not more than 45 equivalents/ton. Especially, if the amount of the terminal carboxyl group is not more than 40 equivalents/ton, the recovery of the film and impact resistance are improved. To attain this, it is preferred to make the amount of the terminal carboxyl groups of the polyester material be not more than 40 equivalents/ton, more preferably not more than 35 equivalents/ton.

In view of the taste characteristics, it is preferred to make the amount of oligomers in the polyester be not more than 0.8% by weight, more preferably not more than 0.7% by weight, still more preferably not more than 0.6% by weight. If the content of the oligomers in the copolymerized polyester is more than 0.8% by weight, the taste characteristics are poor. The method for making the content of the oligomers in the polyester be not more than 0.8% by weight is not restricted. This can be attained by employing the above-described methods for decreasing the acetoaldehyde content in the polyester.

The process for producing the polyester used in the present invention is not restricted and any of the known methods may be employed. The process for producing the polyester will now be described taking the method wherein isophthalic acid is copolymerized in polyethylene terephthalate and germanium dioxide as a germanium compound is added, as an example. Terephthalic acid component, isophthalic acid component and ethylene glycol are subjected to ester exchange reaction or esterification reaction. Then germanium dioxide is added and polycondensation reaction is carried out at a high temperature under reduced pressure until a prescribed diethylene glycol content is attained to obtain a germanium element-containing polymer. In this case, to employ a direct polycondensation method in which an ester exchange catalyst such as a magnesium-containing compound or a manganese-containing compound is not used is preferred since the taste characteristics of the film are improved. Then the obtained polymer is subjected to solid phase polymerization at a temperature not higher than the melting point thereof under reduced pressure or under an inert gas atmosphere to decrease the acetoaldehyde content and to attain the prescribed intrinsic viscosity [η] and the prescribed amount of the terminal carboxylic groups.

It is preferred that the polyester film of the present invention be in the form of a laminate film comprising a layer (I) containing as a major component polyester A having a melting point of 150–230° C. and a layer (II) containing as a major component polyester B having a melting point of 220–250° C., since not only the adhesion between the layer (I) and the metal plate is improved, but also the film is not damaged by a holder used when the can is baked in the air after forming, so that the taste characteristics are good. Thus, it is preferred to provide the layer (II). The composition, catalyst, amount of diethylene glycol and amount of terminal carboxylic groups may be different in each layer. In cases where the edges of the films are recovered, it is preferred to incorporate the recovered edges in the layer of polyester A, in view of the taste characteristics. To make the difference in shrinking characteristics of the layers after shaping small, it is preferred that the difference in melting points of the polyester A and the polyester B be not more than 40° C., more preferably not more than 35° C., still more preferably not more than 30° C. In cases where the polyester film is used as an inner liner of a can, the percentage of the polyester A in layer (I) and the percentage of the polyester B in layer (II) are preferably not less than 70% by weight, more preferably not less than 80% by weight, in view of recovery and taste characteristics.

In layer (I), to promote the impact resistance, a known elastomer such as ethylene/vinyl alcohol copolymer, ethylene/vinyl acetate, ethylene/methacrylic acid copolymer (including Zn salt, Na salt and the like), and polytetramethylene glycol-copolymerized polybutylene terephthalate may be added in an amount of 1–30% by weight, to the extent that the taste characteristics are not adversely affected.

In view of the taste characteristics and impact resistance, the ratio of the thickness of layer (I) to the thickness of layer (II) (layer (I): layer (II)) is preferably 20:1–1:1. In view of the impact resistance, it is especially preferred that the ratio of the thickness of layer (I) to the thickness of layer (II) (layer (I): layer (II)) be 15:1–4:1.

The intrinsic viscosity [η] of the polyester A is preferably not less than 0.7, more preferably not less than 0.75, still more preferably not less than 0.80. If the intrinsic viscosity [η] is less than 0.7, not only the impact resistance is reduced, but also taste characteristics are deteriorated, so that it is not preferred.

The polyester film according to the present invention may be a non-oriented film in the form of a sheet, or may be a uniaxially or biaxially oriented film. In cases where the formability of the film is important such as the case wherein ironing is employed, substantially non-oriented film is preferred. The non-oriented film according to the present invention is preferred since the film excels not only in formability and adhesiveness, but also in impact resistance and taste characteristics. In cases where a relatively mild shaping method such as drawing is employed or in cases where shaping is not performed, substantially non-oriented film or an oriented film having a coefficient of planar orientation fn of 0–0.12 is preferred, the coefficient of planar orientation being defined by the equation:

$$fn=(Nx+Ny)/2-Nz$$

wherein Nx, Ny and Nz mean refractive indices in longitudinal, transverse and thickness directions, respectively. In this case, non-oriented film is preferred because the equipment for film-formation can be simpler. In cases where a non-oriented film is employed, to prevent the film from being broken, the edge portions may be thickened in the film-forming process, or the portions which contact the blade used for slitting the film may be heated at a temperature not lower than the glass transition point ant not higher than the melting point before slitting the film, in the film-forming process. Further, the non-oriented film may be slightly stretched to the extent that the formability of the non-oriented film is not deteriorated. In this case, the non-oriented film may be slightly stretched at least in one direction at a temperature not lower than the glass transition point such that the refractive index in the direction of the thickness is within the range of not less than 1.55 and not more than 1.57, preferably not less than 1.56 and not more than 1.57.

In view of ease of handling and in view of suitability to high speed lamination, at least one surface of the polyester film according to the present invention preferably has an average roughness Ra of 0.001–1 $\mu$m, more preferably 0.005–0.5 $\mu$m, still more preferably 0.01–0.1 $\mu$m. Further, the ratio Rt/Ra of maximum surface height Rt to the average roughness Ra is preferably 3–60, more preferably 5–50, still more preferably 5–30, because voids (such as pin holes) are unlikely formed during forming and the high speed lamination property is improved.

To obtain the polyester film having the above-mentioned surface characteristics, the film preferably contains inorganic particles and/or organic particles with an average particle size of 0.01–10 $\mu$m in an amount of 0.001–10% by weight. To prevent the particles from being dropped off from the film, it is preferred to contain inorganic particles and/or organic particles having an average particle size of 0.1–5 $\mu$m in an amount of 0.005–3% by weight. Examples of the inorganic and organic particles include inorganic particles such as wet and dry silica, colloidal silica, titanium oxide, calcium carbonate, calcium phosphate, barium sulfate, alumina, mica, kaolin and clay; and organic particles containing as a constituent styrene, divinylbenzene, silicone, acrylic acid, polyesters or the like. Among these, inorganic particles such as silica and calcium carbonate; and organic particles containing as a constituent styrene, silicone, acrylic acid, methacrylic acid, polyesters, divinylbenzene or the like are preferred. Two or more of these inorganic particles and/or organic particles may be employed in combination.

If particles having an average particle size of more than 10 $\mu$m are employed, voids are likely formed in the film, so that it is not preferred. Especially, if particles having a particle size of not less than 30 $\mu$m are contained, the characteristics are largely deteriorated. Therefore, it is preferred to employ a filter by which foreign matter with a size of not less than 30 $\mu$m can be largely reduced in the film formation.

To prevent the formation of voids in the film due to the drop off of the particles during forming, it is preferred to precipitate non-incorporated particles during the polycondensation process for producing the polyester so as to form protrusions on the film surfaces.

The method for precipitating non-incorporated particles is not restricted. For example, non-incorporated particles are precipitated by carrying out the polycondensation according to a conventional method employing an alkaline metal compound or an alkaline earth metal compound as an ester exchange catalyst. Terephthalic acid or the like may be added during the ester exchange reaction or the polycondensation reaction. Alternatively, in the esterification reaction, an alkaline metal compound or an alkaline earth metal compound is made to exist before or after completion of the esterification reaction, and the polycondensation reaction is carried out in the presence of a phosphorus compound, thereby precipitating the non-incorporated particles. In this case, in view of the uniformity of the particle size, the number of moles (A) of the alkaline metal compound, the number of moles (B) of the alkaline earth metal compound, and the number of moles (P) of the phosphorus compound satisfy the relationship that (B+0.5 A)/P is 0.5–5.

The amount of the non-incorporated particles is preferably 0.01–2% by weight, and the amount can be determined by, for example, the following method:

To 30 g of a polyester sample, 300 g of o-chlorophenol is added and the polymer is dissolved at 100° C. for 1 hour under stirring. A roter RP30 is mounted on an ultracentrifugal machine type 40P commercially available from HITACHI, LTD. After placing 30 ml of the obtained solution per one cell, the revolution is gradually increased to 30,000 rpm and centrifugation is performed for 1 hour at this revolution to complete the separation of the particles. The supernatant is removed and the separated particles are recovered. To the recovered particles, o-chlorophenol is added at room temperature and the particles are uniformly suspended, followed by ultracentrifugation. This operation is repeated until the peak of melting of the polymer is not detected by DSC. The thus obtained particles are dried in vacuum at 120° C. for 16 hours and the weight of the particles is measured.

The non-incorporated particles and other inorganic particles and/or organic particles may be employed in combination.

In case of a laminate film, although the particles may be contained in either layer (I) or layer (II), in view of ease of handling, it is preferred to add the particles to layer (II). The ratio D/d of the average particle size D ($\mu$m) to the thickness d ($\mu$m) of layer (II) is preferably 0.05–50, more preferably 0.1–10. To improve slipperiness, the ratio D/d is still more preferably 0.5–5.

On the other hand, particles may be added to layer (I) to the extent that characteristics such as recovery are not deteriorated. Further, in cases where slipperiness is important, in solidifying the polymer on a casting drum after melt-extrusion of the polymer, a drum having a rough surface may be employed and the film may be urged to the casting drum with air by using an air knife cast or the like. By so doing, the film surface is made rough.

Although the thickness of the polyester film according to the present invention is not restricted, in view of the formability of the metal can, impact resistance and taste characteristics, the thickness is preferably 5–50 $\mu$m, more preferably 8–40 $\mu$m, still more preferably 10–40 $\mu$m.

The polyester film according to the present invention can be prepared by an arbitrary known method. One example of the production process of the film according to the present invention will now be described. However, the production process is not restricted thereto.

Polyethylene terephthalate in which 17.5 mol % of isophthalic acid is copolymerized (germanium element content: 40 ppm, [$\eta$]=0.85, diethylene glycol content: 0.92% by weight, melting point: 213° C., acetaldehyde content: 12 ppm, amount of terminal carboxyl groups: 21 equivalents/ton) as the polyester A, and polyethylene terephthalate in which 5 mol % of isophthalic acid is copolymerized (germanium element content: 42 ppm, [$\eta$]=0.90, diethylene glycol content: 0.89% by weight, melting point: 240° C., acetaldehyde content: 10 ppm, amount of terminal carboxyl groups: 20 equivalents/ton, silicon oxide particles: 0.3% by weight (average particle size: 2 $\mu$m) as the polyester B are supplied to separate extruders of biaxial vent type (The temperature of the extruder is set at melting point +25° C.), and the polyesters are melted in the extruders. Thereafter, the polymers are laminated in two layers by using a feed block and extruded from a conventional die. The extruded sheet is cooled to solidify on a casting drum to which static charge is applied, such that layer (I) contacts the drum, to obtain a cast film. The thus obtained bilayered laminate film is wound after, as required, aging under heat or a surface-activating treatment.

The above-described polyester cast film may be biaxially stretched simultaneously or sequentially. In case of sequential biaxial stretching, the stretching in the longitudinal direction or transverse direction may be performed twice or more. The stretching ratio in the longitudinal and transverse directions of the film may be arbitrarily selected depending on the desired degree of orientation, strength and elasticity of the film. Preferably, the stretching ratio in each direction is 2.5–5.0 times the original length. The stretching ratio in each direction may be different or the same. In the former case, the stretching ratio in the longitudinal direction may be larger or smaller than that in the transverse direction. The stretching temperature may be any temperature within the range between not lower than the glass transition point of the polyester and not higher than the crystallization temperature. Usually, a temperature of 80–150° C. is preferred. After the biaxial stretching, the film may be heat set. This heat set may be carried out by an arbitrary known method in a tenter, on a heated roll or the like. The heat set temperature may be any temperature within the range between not lower than the crystallization temperature and not higher than the softening point of the polyester. Preferably, the heat set temperature is 120–240° C. Although the time of the heat set is not restricted, usually a time of 1–60 seconds is preferred. The heat set may be performed while relaxing the film in the longitudinal direction and/or in the transverse direction.

In the present invention, it is preferred that at least one surface of the film have a surface wetting tension of not less than 45 dynes/cm because the impact resistance of the can obtained by forming the laminate prepared by high speed lamination is largely promoted. The surface wetting tension is more preferably not less than 48 dynes/cm, still more preferably not less than 50 dynes/cm.

As the method for making the surface wetting tension of at least one surface of the film be not less than 45 dynes/cm, known methods such as discharge treatments, chemical treatments and flame treatments may be employed. Among these, corona discharge treatment is preferred as a method for improving impact resistance. If a region having a strong electric field is localized, local discharge restricted to the region occurs. This is called corona discharge. The corona discharge treatment is the treatment to place a film under the discharge to treat the surface of the film. The corona discharge treatment may be performed in the air, in nitrogen or in carbon oxide gas. For example, corona discharge treatment described in Japanese Laid-open Patent Application (Kokai) No. 1-20236 and Japanese Patent Publication (Kokoku) No. 57-30854 may preferably be employed. The intensity of the corona discharge treatment is expressed in terms of E value. E value is defined as W/(D·V) wherein W means the power of the treatment (W), D means the width of the treated portion (m), and V means the film speed (m/min). In view of the promotion of the surface wetting tension and in view of preventing surface voids, E value is preferably 10–60, more preferably 15–35. If the treatment is performed at a temperature not lower than the glass transition point of the polymer, the surface wetting tension can be effectively increased. It is preferred to perform the surface treatment to the surface to be adhered to the metal.

To make the number of pin holes after forming small and to promote the impact resistance, it is preferred that the polyester for thermal lamination according to the present invention have at least two peaks of melting within the range between 150 and 230° C. That is, by laminating or blending a polyester having a relatively high melting point and a polyester having a melting point lower than that of the first polyester, the heat resistance of the film against the thermal history during the forming of the can may be improved and the formation of the pin holes can be hindered. Especially, in cases where polyesters having different melting points are blended, it is preferred that the difference in the melting point be not less than 5° C., since the resistance to formation of pin holes is improved. The drying temperature of the can during the washing step in the forming of the can is usually 200–220° C. In this case, to promote the resistance to formation of pin holes, it is preferred that the high melting polyester have a melting point of not lower than 210° C. and the low melting polyester have a melting point of 150–205° C., more preferably 150–200° C. Although the content of the low melting polyester is not restricted, in view of the resistance to formation of pin holes, the content thereof in layer (I) is preferably more than 10% by weight, more preferably not less than 15% by weight, still more preferably not less than 20% by weight. Taking the impact resistance and the resistance to formation of pin holes simultaneously into consideration, the content of the low melting polyester in layer (I) is preferably 10–50% by weight, more preferably 10–30% by weight. Further, if the intrinsic viscosity [η] of the low melting polyester to be blended is not less than 0.7, the impact resistance is improved, so that it is preferred. Although the low melting polyester may be arbitrarily selected from the above-described polyesters, in view of the impact resistance, polybutylene terephthalates, isophthalic acid-copolymerized polybutylene terephthalates, isophthalic acid-copolymerized polyethylene terephthalates may preferably be employed. Among these, isophthalic acid-copolymerized polyethylene terephthalates are preferred in view of taste characteristics.

It is thought that the promotion of the resistance to formation of pin holes is due to the fact that the low melting polymer is made flowable by heat so that the formation of pin hole is hindered, and very small pin holes, if formed, may be crushed.

The fact that the polyester has at least two peaks of melting within the range of 150–230° C. is preferred from the view point of impact resistance too. Further, if the glass transition point of the polyester to be blended is not higher than 50° C., the impact resistance at low temperature is improved, so that it is preferred.

It is preferred that the polyester to be blended have a melting point different from that of polyester A, because a preferred structural change is brought about by the difference in the flowability when melted.

Preferred examples of the polyester to be blended include polybutylene terephthalates, isophthalic acid-copolymerized polybutylene terephthalates, cyclohexanedimethanol-copolymerized polyethylene terephthalates and the like. The content thereof with respect to polyester A is preferably 1–50% by weight, more preferably 1–30% by weight.

To improve the impact resistance after receiving thermal history of not lower than 200° C. and the impact resistance after being treated with pressurized vapor with a temperature of about 120° C. (retort treatment), it is preferred that the polyester contain an antioxidant in an amount of 0.001–1% by weight, more preferably 0.002–0.2% by weight, still more preferably 0.003–0.1% by weight.

If the amount of the antioxidant is less than 0.001% by weight, the effect of promoting the impact resistance is not obtained, and if it is more than 1% by weight, the taste characteristics are deteriorated, so that it is not preferred.

The type of the antioxidant is not restricted, and known antioxidants such as hindered phenols, hydrazines and phosphites may be used. In particular, pentaerythrityl-tetrakis[3-(3,5-di-t-butyl-4-hydroxyphenyl)propionate], 3,5-di-t-tubyl-4-hydroxy-benzylphosphonate diethyl ester, 1,3,5-trimethyl-2,4,6-tris(3,5-di-t-butyl-4-hydroxybenzyl)benzene, tris(2,4-di-t-butylphenyl)phosphite and the like may be used appropriately.

In view of taste characteristics, it is preferred that layer (II) do not substantially contain an antioxidant and layer (I) alone contain the antioxidant.

In producing the polyester film according to the present invention, additives such as plasticizers, antistatic agents, weathering stabilizers, terminal blocking agents and the like may appropriately be used.

As mentioned above, the polyester film for thermal lamination according to the present invention is excellent in formability, adhesiveness, impact resistance and taste characteristics, so that it can be thermally laminated on not only metal substrates, but also various other substrates such as paper sheets, plastic sheets, fibers and non-woven fabrics. Thus, the film according to the present invention may be suitably used for products such as containers.

On the other hand, in cases where a metal can is produced by shaping such as drawing or ironing after obtaining a laminate metal plate comprising a metal plate as a substrate, the metal laminate may be suitably used as a container of positive pressure type or negative pressure type because metal plate is used as the substrate. If the substrate to be coated with the film is a steel plate or an aluminum plate, or steel or aluminum plate whose surface is treated, not only the shaping can be easily performed but also the can has excellent impact resistance, so that it is preferred.

Although the metal to be used in the present invention is not restricted, metals comprising as major constituent iron, aluminum or the like are preferred. In case of a metal plate made of iron, an inorganic oxide coating layer for improving the adhesiveness and anti-corrosive property, such as a chemically formed coating layer formed by treatment with chromic acid, phosphoric acid, chromic acid/phosphoric acid, electrolytic chromic acid, chromate, chromium chromate, or the like, may be formed. Especially, hydrated chromium oxide containing chromium of 6.5–150 mg/m$^2$ in terms of chromium metal is preferred. Further, melleable and ductile metal plated layer, for example, nickel, tin, zinc, aluminum, gun metal or brass layer may be formed. In case of tin plating, an amount of plating of 0.5–15 g/m² is preferred. In case of nickel or aluminum plating, an amount of plating of 1.8–20 g/m² is preferred.

The film for thermal lamination according to the present invention may suitably be used for coating the inner surface or outer surface of two-piece metal cans produced by drawing or ironing. Further, the film may preferably be used for coating the lid of two-piece cans and for coating the body, lid and bottom of three-piece cans since the film has a good adhesion with metal and good formability. In particular, for coating the outer surface of a can, a colored film according to the present invention may be used. For this, a coloring agent may be added to the polyester layer. As the coloring agent, white, red and the like may be employed. It is preferred to add a coloring agent selected from titanium oxide, zinc flower, lithopone, and inorganic and organic pigments in an amount of 5–50% by weight, more preferably 15–40% by weight. If the added amount is less than 5% by weight, the color tone, whiteness and the like are poor, so that it is not preferred. As required, a pinking agent or a bluing agent may also be used in combination. In this case, the intrinsic viscosity of the film according to the present invention is measured after separating the particles by centrifugation or the like.

The method for covering the metal with the polyester film is not restricted, and the metal may be coated with the film through an adhesive or directly. It is best suited for the purpose of the present invention to heat the polyester film per se or to heat the metal so as to partially melt the polyester and then to press the film, followed by rapid cooling to coat the metal with the film. In cases where the polyester film is a laminate film having two or more layers, it is preferred to make the layer having lower melting point contact the metal. In view of resistance to formation of pin holes, it is preferred to blow ultrasonic air to the surface of the polyester film by immediately before the coating. The ultrasonic wave is set to have a plurality of peaks within the range between 20 and 60 kHz, and the peaks may be arbitrarily changed depending on the object.

The velocity of the air is preferably 10–200 m/sec, more preferably 100–150 m/sec for the purpose of the present invention. Needless to say, the air is preferably ultra-washed air obtained by filtering air through HEPA filter having an exclusion size of not more than 0.3 μm. The distance between the blowing nozzle and the treated surface is preferably short, usually 2–5 mm. By blowing the ultrasonic air, formation of cracks and pin holes in the coating polyester film and breakage of the coating film after baking step (e.g., 220° C. for 10 minutes) or retort treatment (e.g., 120° C. for 30 minutes) after subjecting the coated metal to ironing (e.g., DI (Drawing and Ironing) accompanying deformation of about 200%) or drawing (e.g., DTR (Drawing and Thin-Redrawing) accompanying deformation of about 30–80%) are hindered, so that the coated metal exhibits excellent performance. Although the reason of this is not clear, it is assumed that the surface structure or morphology of the polyester film is changed by the ultrasonic air, and adhesiveness with the metal and the property to be co-stretched with the metal are promoted.

In the present invention, before blowing ultrasonic air, by blowing high-frequency ion air having a frequency of about 1–30 kHz, the effects of the present invention are further promoted. This is presumably because a structural change of the film surface, which is different from that obtained by blowing ultrasonic wave, is brought about. As the high-frequency wave, one having an oscillation frequency of about 13.5 kHz is usually employed. Although the velocity of the air is not restricted, the effects of the present invention are highly obtained at a velocity of 1–50 m/sec.

By providing a vacuum air camber between the blowing of the ultrasonically vibrated air and high-frequency ion air, the effects of the present invention are further promoted. This is presumably because the gas, gasificated substances and impurities generated by blowing the ultrasonically vibrated air and high-frequency ion are aspirated.

By blowing the ultrasonically vibrated air or the high-frequency ion air, even if the thickness of the coating polyester film is small, a coating film having high impact resistance, high resistance to formation of pin holes and high stress crack resistance, which film withstands the severe heat treatment after forming is obtained.

Methods for measuring and evaluating characteristics concerning the present invention will now be described.

(1) Content of Diethylene Glycol Component in Polyester

The content of diethylene glycol component in a polyester was measured by NMR (13C-NMR spectrum).

(2) Melting Point of Polyester

The melting point was measured for crystallized polyester chip or film with a differential scanning calorimeter (DSC-2 type, commercially available from Perkin-Elmer) at a heating rate of 10° C./min.

(3) Intrinsic Viscosity of Polyester

A polymer was dissolved in o-chlorophenol and the intrinsic viscosity was determined by measuring the relative viscosity at 25° C.

The intrinsic viscosity of each layer of a laminate film was measured after shaving the layer of the film from the surface of the film with a blade (It should be noted, that the remaining layer after shaving off another layer may also be subjected to measurement after washing with a solvent such as o-chlorophenol).

(4) Content of Germanium Element in Polyester

The content of germanium element in a polyester was quantified from a calibration curve of a relationship between the content of germanium element in the polyester composition and peak intensity measured by fluorescent X-ray analysis.

(5) Content of Acetoaldehyde

Two grams of fine powder of a polyester film was taken and was supplied to a pressure-resistant container together with ion-exchanged water, and the polyester was extracted with water at 120° C. for 60 minutes, followed by subjecting the resultant to high sensitivity gas chromatography.

(6) Terminal Carboxyl Groups (equivalents/ton)

A polyester was dissolved in o-cresol/chloroform (7/3 w/w) at 90–100° C. for 20 minutes, and the amount of the terminal carboxyl groups was determined by potentiometric titration using a base.

(7) Content of Oligomer

In 1 ml of o-chlorophenol, 100 mg of a polyester film was dissolved and the amount of cyclic trimers was measured by liquid chromatography (Model 8500, commercially available from Varian). The measured amount is defined as the amount of oligomers.

(8) Water Content in Polyester Chip

A polyester chip was heated to a temperature near the melting point by a gasification apparatus, and water content was measured with a Karl Fischer's water meter.

(9) Average Particle Size

Thermoplastic resin is removed from the surface of a film by plasma low temperature ashing treatment to expose particles. The treatment conditions are selected such that the thermoplastic resin is ashed while the particles are not damaged. The resultant is observed with a scanning electron microscope (SEM) and the image of the particles is treated by an image analyzer. Changing the observed region, not less than 5,000 particles are observed. Thereafter, the number average diameter D is calculated according to the following equation, which is defined as the average particle size:

$$D=\Sigma Di/N$$

wherein Di means circle-corresponding diameter of a particle and N means the number of particles.

In case of non-incorporated particles, the average particle size may be measured by observing a section of a film with a transmission type microscope.

(10) Content of Antioxidant

After dissolving a film in hexafluoroisopropanol, polyester was sedimentated by acetonitrile. After appropriately concentrating the liquid, the content of antioxidant was measured by liquid chromatography.

(11) Coefficient of Planar Orientation

The coefficient of planar orientation was measured using sodium D line (wavelength: 589 nm) as a light source by using Abbe's refractometer. The coefficient of planar orientation was calculated according to the equation:

$$fn=(Nx+Ny)/2-Nz$$

wherein Nx, Ny and Nz mean refractive indices in longitudinal, transverse and thickness directions, respectively.

(12) Surface Wetting Tension of Film

The surface wetting tension of a film was measured in accordance with JIS K-6768. As the standard, the following three systems were used depending on the surface tension:

30 dynes/cm≦γ<56 dynes/cm:
  JIS K-6768 standard solution
56 dynes/cm≦γ<72 dynes/cm: aqueous ammonia
72 dynes/cm≦γ: aqueous sodium hydroxide solution

(13) Surface Roughness of Film (average roughness Ra, maximum roughness Rt)

Surface roughness of the film was measured by surface roughness meter. The measuring conditions are as described below, and average of 10 measurements was employed. As the measuring apparatus, SE-3E commercially available from KOSAKA KENKYUJO was used.

radius of tip of touching stylus: 2 μm
load on touching stylus: 0.01 g
measured length: 5 mm
cut off: 0.25 mm

(14) Adhesiveness

A surface of a polyester film according to the present invention and an Sn-plated tin plate were stacked and the resultant was passed between a metal roll heated at 180–230° C. and a silicone rubber roll under a pressure of 20 kg/cm to pressure-adhere the film to the tin plate, followed by cooling the resultant in the air. The adhesion force of the laminate plate was measured by a peeling test at angle of 180° (10 measurements) and the average of the adhesion force was calculated. The film having an average adhesion force of not less than 250 g/cm was evaluated as acceptable.

(15) Shapability
(Drawn and Ironed can)

A surface to be adhered of a polyester film and an Sn-plated tin plate were laminated at a temperature of 180–230° C. under pressure and the obtained laminate was shaped with a drawing and ironing machine (forming ratio (maximum thickness/minimum thickness)=3.0) to shape the bottom. Thereafter, the resultant was baked in the air at 220° C. for 10 minutes to obtain a Draw and Ironed can. Further, 1% saline solution was placed in the can and a voltage of 6 V was applied across an electrode in the saline and the metal can, and the electric current was read from an ampere meter. Those with which the average of 10 cans is not more than 0.2 mA were evaluated as acceptable.
(drawn and thin-redrawn can)

A surface to be adhered of a polyester film and a TFS metal plate were laminated at a temperature of 180–240° C. under pressure and the obtained laminate was shaped with a drawing and thin-redrawing shaping machine (shaping ratio (maximum thickness/minimum thickness)=1.3) to shape the bottom. Thereafter, the resultant was baked in the air at 220° C. for 2 minutes to obtain a Drawn and Thin-Redrawn can. Further, 1% saline solution was placed in the can and a voltage of 6 V was applied across an electrode in the saline and the metal can, and the electric current was read from an ampere meter. Those with which the average of 10 cans is not more than 0.2 mA were evaluated as acceptable.

(16) Impact Resistance

After preparing a can as mentioned above, the following impact resistances were measured. Those having an average of 10 cans of not more than 0.2 mA were evaluated as acceptable.

(a) After baking the can in the air, aqueous carbonic acid solution was filled in the can and the resultant was left to stand at 5° C. for 24 hours. From outer surface of the bottom of the can, 5 portions per a can were impacted, and the content of the can was removed. The inner surface of the can was masked with a wax. On the other hand, 1% saline was placed in a cup, and a voltage of 6 V was applied across an electrode in the saline and the metal can. The electric current was read from an ampere meter.

(b) After baking the can in the air, the can was subjected to retort treatment at 120° C. for 30 minutes and commercially available woolong tea was placed. The resultant was left to stand at 20° C. for 24 hours. From outer surface of the bottom of the can, 5 portions per a can were impacted, and the content of the can was removed. The inner surface of the can was masked with a wax. On the other hand, 1% saline was placed in a cup, and a voltage of 6 V was applied across an electrode in the saline and the metal can. The electric current was read from an ampere meter.

(17) Taste Characteristics (a) A can (diameter: 6 cm, height: 12 cm) was immersed in an aqueous perfume solution (20 ppm aqueous d-limonene solution) at 20° C. for 5 days. The film was then heated at 80° C. for 30 minutes under nitrogen gas flow and the driven out component was measured by gas chromatography. The amount of the adsorbed d-limonene per 1 g of film was determined, thereby evaluating the taste characteristics of the film.

(b) A perfume solution (20 ppm aqueous d-limonene solution) was placed in a formed can and the can was tightly closed. After leaving the closed can to stand for 1 month, the can was opened. The change in smell was evaluated by organoleptic test according to the following criteria:

Class A: no change in smell is observed
Class B: substantially no change in smell is observed
Class C: change in smell is observed The present invention will now be described by way of examples thereof. The invention is not limited to the examples.

EXAMPLE 1

Polyethylene terephthalate copolymerized with 17.5 mol % of isophthalic acid as polyester A was prepared by direct polymerization method. That is, bis-β-hydroxyethylterephthalate-isophthalate copolymer was melted and stored in an amount of 50 vol %. To this melt, isophthalic acid and ethylene glycol were gradually added at a molar ratio of the acid component to glycol component of 1.6 under stirring while heating the mixture to 240° C. After evaporating about theoretical amount of water, the mixture was transferred to a reactor and 0.15% by weight of trimethyl phosphate and germanium oxide were added to obtain a polyester having an intrinsic viscosity [η] of 0.68. Thereafter, the obtained polyester was subjected to solid phase polymerization to obtain polyester A. The content of germanium element was 40 ppm, [η] was 0.87, diethylene glycol content was 0.92% by weight, melting point was 213° C., content of acetoaldehyde was 8 ppm, and the amount of terminal carboxyl groups was 21 equivalents/ton. On the other hand, polyethylene terephthalate copolymerized with 5 mol % of isophthalic acid as polyester B was prepared by the same direct polymerization method as described above except that ethylene glycol slurry containing 20% by weight of silicon oxide particles was added after completion of esterification reaction to obtain a polyester having [η] of 0.64, followed by solid phase polymerization to obtain polyester B. The content of germanium element was 42 ppm, the content of silicon dioxide particles was 0.2% by weight, [η] was 0.90, the content of diethylene glycol was 0.89% by weight, the melting point was 240° C., the content of acetoaldehyde was 6 ppm, and the amount of terminal carboxyl groups was 20 equivalents/ton. The polyester A and polyester B were dried in vacuum (1 mmHg) at 150° C. for 5 hours to attain a water content of 25 ppm, and supplied to separate extruders of biaxial vent type. The temperature of each extruder was set to the melting point +25° C., and the average dwelling time was about 20 minutes and 15 minutes, respectively. After melting the polyesters, the polyesters were laminated into two layers by using a field block (layer (I) consisting of polyester A/layer (II) consisting of polyester B=9/1) and the resultant was extruded from a conventional die. The extruded sheet was cast on a cooling drum at 20° C. while applying static charge to the drum such that layer (I) contacts the drum to solidify the sheet, thereby obtaining a cast film with a thickness of 30 μm. The content of diethylene glycol of the obtained film was 0.91% by weight, the content of acetoaldehyde was 12 ppm, [η] was 0.81, the amount of terminal carboxyl groups was 28 equivalents/ton and the oligomer content was 0.6% by weight. The surface wetting tension of layer (I) was 42 dynes/cm. The layer (II) had an average roughness Ra of 0.018 μm and a maximum roughness of 0.30 μm, and the average particle size of the particles in layer (II) was 4 μm. The intrinsic viscosities [η] of layers (I) and (II) were about the same.

The thus obtained bilayer laminate cast film was laminated on a tin metal plate at 217° C. such that layer (I) contacts the metal plate and the resultant was subjected to drawing and ironing to obtain a can. The characteristics of the thus obtained can are shown in Table 2. As shown in Table 2, all of the adhesiveness, shaping property, impact resistance and taste characteristics were good. Further, to evaluate the performance of the thus obtained film when applied to a drawn and thin-redrawn can, the following evaluation was made. That is, the film and a TFS plate with a thickness of 0.25 mm heated at 220° C. by passing electric current were pressed with a roll such that layer (I) contacts the TFS plate to obtain a laminate, and a drawn and thin-redrawn can having a forming ratio of 1.3 was prepared therefrom. The characteristics of the can were evaluated in the same manner. As shown in parentheses in Table 2, the adhesiveness, shapability, impact resistance and taste characteristics were good.

EXAMPLE 2

The same procedure as in Example 1 was repeated except that the silicon oxide particles were spherical particles with an average particle size of 3 μm and added in an amount of 0.5% by weight, and corona discharge treatment was performed at an E value of 25 W.min/m² at 30° C. in the air before winding the film. As a result, the surface wetting tension of layer (I) was 54 dynes/cm. As can be seen from Table 2, the obtained film was especially excellent in adhesiveness, and had good shapability and impact resistance.

EXAMPLE 3

A bilayer laminate cast film and a can were prepared in the same manner as in Example 1 except that an antioxidant IRGANOX 1010 (pentaerythrityl-tetrakis-[3-(3,5-di-t-butyl-4-hydroxyphenyl)propionate]) commercially available from Ciba-Geigy Japan Limited was added to polyester A to a final concentration in the film of 0.03% by weight. As can be seen from Table 2, since the film contained an appropriate amount of antioxidant, the impact resistance after retort treatment was especially good.

EXAMPLE 4

The same procedure as in Example 3 was repeated except that the amount of the antioxidant in the film was 1.2% by weight. Both the impact resistance and taste characteristics were deteriorated.

EXAMPLE 5

A bilayer laminate cast film and a can were prepared in the same manner as in Example 1 except that the intrinsic viscosity [η] of polyester A and polyester B was 0.8. As can be seen from Table 4, since the intrinsic viscosity was lower than that of the film prepared in Example 1, the impact resistance was somewhat reduced.

EXAMPLE 6

As polyester A, polyethylene terephthalate copolymerized with 16 mol % of isophthalic acid was prepared. That is, dimethyl terephthalate, dimethyl isophthalate and ethylene glycol were fed at a molar ratio of ethylene glycol to the acid components of 1.9 together with 0.03% by weight of manganese acetate. After melting the mixture, the melt was heated to 150–235° C. under stirring. After about theoretical amount of water was evaporated, 0.15% by weight of trimethyl phosphate and 0.04% by weight of antimony trioxide were added and the mixture was transferred to a reaction vessel. The pressure was gradually reduced to 0.5 mmHg under stirring and the mixture was heated to 285° C. to carry out polycondensation reaction, thereby obtaining a polyester with an intrinsic viscosity [η] of 0.66 in a relatively short time. The obtained polyester was subjected to solid phase polymerization to obtain polyester A. The intrinsic viscosity [η] was 0.90, the diethylene glycol content was 0.53% by weight, the melting point was 218° C., the acetoaldehyde content was 14 ppm, and the amount of terminal carboxyl groups was 24 equivalents/ton. As polyester B, polyethylene terephthalate copolymerized with 3 mol % of isophthalic acid was prepared by the direct polycondensation method as in Example 1 using 0.15% by weight of trimethyl phosphate and germanium dioxide to obtain a polyester having an intrinsic viscosity [η] of 0.64. The obtained polyester was subjected to solid phase polymerization to obtain the polyester B. The content of germanium element was 45 ppm, the content of cross-linked polystyrene particles was 0.2% by weight, the intrinsic viscosity [η] was 0.88, the diethylene glycol content was 0.80% by weight, the melting point was 244° C., the acetoaldehyde content was 10 ppm, and the amount of terminal carboxyl groups was 19 equivalents/ton. The polyester A and polyester B were supplied to separate extruders of uniaxial type. The temperature of each extruder was set to the melting point +30° C., and the average dwelling time was about 25 minutes and 20 minutes, respectively. After melting the polyesters, the polyesters were laminated into two layers by using a field block (layer (I) consisting of polyester A/layer (II) consisting of polyester B=8/2) and the resultant was extruded from a conventional die. The extruded sheet was cast on a textured cooling drum having a surface roughness of 8μm at 20° C. while blowing air to the film such that layer (II) contacts the drum to solidify the sheet, thereby obtaining a cast film with a thickness of 30 μm.

The content of diethylene glycol of the obtained film was 0.61% by weight, the content of acetoaldehyde was 19 ppm, [η] was 0.82, the amount of terminal carboxyl groups was 28 equivalents/ton and the oligomer content was 0.5% by weight. The surface wetting tension of layer (I) was 42 dynes/cm. The layer (II) had an average roughness Ra of 0.020 μm and a maximum roughness of 0.250 μm.

High-frequency ion air (wind velocity: 8 m/sec., frequency: 30,000 Hz) was blown to the thus obtained film, and then the impurities in the atmosphere near the film surface was aspired by a vacuum air camber. Ultrasonically vibrated air (wind velocity: 120 m/sec, frequency: 60 kHz) was blown to layer (I) of the film so as to remove dusts, and then blown to layer (II) in the same manner to remove dusts. From the thus obtained film, a laminate and a can were prepared in the same manner as in Example 1. As a result, the number of the voids of the coating film after shaping were largely reduced and good characteristics were obtained.

EXAMPLE 7

The same procedure as in Example 6 was repeated except that the wind velocity of the ultrasonically vibrated air was 30 m/sec. As a results, the number of voids in the coating film after shaping was hardly reduced.

EXAMPLE 8

The cast film obtained in Example 1 was stretched in the longitudinal direction at 90° C. at a stretching ratio of 3.2 times the original length and then in the transverse direction at 95° C. at a stretching ratio of 3.3 times the original length. The resulting film was heat set at 180° C. for 5 seconds while relaxing the film by 5%. As shown in parentheses in Table 6, the impact resistance was especially good in the drawn and thin-redrawn can. On the other hand, in the Drawn and Ironed can, shapability was low as shown in Table 6.

EXAMPLE 9

The same procedure as in Example 1 was repeated except that polybutylene terephthalate copolymerized with 30 mol % of isophthalic acid ([η]=0.87, melting point: 153° C.) was incorporated in layer (I) in an amount of 10% by weight. Since the film contained an appropriate amount of a low melting polyester having high molecular weight, the characteristics were especially excellent.

EXAMPLE 10

The same procedure as in Example 1 was repeated except that polyethylene terephthalate (content of germanium element: 40 ppm; [η]=0.87; diethylene glycol content: 0.92% by weight; melting point: °C.; acetoaldehyde content: 8 ppm; amount of terminal carboxyl groups: 21 equivalents/ton) was incorporated in layer (I) in an amount of 20% by weight, and that the extrusion temperature was 280° C. As a result, the shapability and impact resistance were largely reduced.

EXAMPLE 11

A film and a can were prepared in the same manner as in Example 1 except that the polymer was prepared such that the amount of the terminal carboxyl groups of polyester A and polyester B was 42 equivalents/ton, and that the polymer was melt extruded at melting point +40° C. As a result, the impact resistance after retort treatment was deteriorated.

EXAMPLE 12

A film and a can were prepared in the same manner as in Example 1 except that 0.03% by weight of antimony trioxide was used as the polymerization catalyst and the diethylene glycol content was 0.53%. As a result, taste characteristics were deteriorated.

EXAMPLE 13

A film and a can were prepared in the same manner as in Example 1 except that the ratio of thickness of layer (I) to layer (II) was 1:1. As a result, impact resistance was deteriorated.

EXAMPLE 14

The procedure described in Example 1 was repeated except that the metal plate was made of aluminum. As a result, good characteristics were obtained.

EXAMPLE 15

The process for producing polyester B was changed to a conventional process employing dimethyl terephthalate and an ester exchange catalyst, and the particles were changed to non-incorporated particles. That is, after esterification reaction, lithium acetate was added to a concentration of 0.2% by weight, and a trimethyl phosphate solution in ethylene glycol was added to attain a concentration of trimethyl phosphate of 0.17% by weight. After adding germanium oxide as a polymerization catalyst, 0.11% by weight of calcium acetate was added. Further, after film forming, the edge portions of the film were crushed to recover the edge portions and the resultant was blended to polyester A to a concentration of 15%. Further, the thickness ratio of each layer was changed. As a result, promotion of formability which is thought to be due to the effects brought about by changing the particle system was obtained, and other characteristics were also good.

COMPARATIVE EXAMPLE 1

A film and a can were prepared in the same manner as in Example 1 except that polyester A before the solid phase polymerization and polyester B before the solid phase polymerization were used. With the obtained can, the impact resistance and taste characteristics were especially deteriorated and a good can was not obtained.

COMPARATIVE EXAMPLE 2

A film and a can were prepared in the same manner as in Example 1 except that polyester A before the solid phase polymerization was used. With the obtained can, the impact resistance was especially deteriorated and a good can was not obtained.

COMPARATIVE EXAMPLE 3

In the procedure described in Example 1, the polycondensation was carried out such that the diethylene glycol content in polyester A and in polyester B was 1.6% by weight, to obtain a polyester having an intrinsic viscosity $[\eta]$ of 0.67 and an amount of terminal carboxyl groups of 43 equivalents/ton, and a polyester having an intrinsic viscosity $[\eta]$ of 0.66 and an amount of terminal carboxyl groups of 41 equivalents/ton. By subjecting the polyester A and polyester B to solid phase polymerization, a polyester having an intrinsic viscosity $[\eta]$ of 0.85 and an amount of terminal carboxyl groups of 35 equivalents/ton, and a polyester having an intrinsic viscosity $[\eta]$ of 0.86 and an amount of terminal carboxyl groups of 33 equivalents/ton were obtained. A film and a can were prepared from the thus obtained polyester in the same manner as in Example 1, except that the extrusion temperature was melting point +10° C. and the average dwelling time was 40 minutes. As a result, the impact resistance and the taste characteristics are especially deteriorated and a good can was not obtained.

COMPARATIVE EXAMPLE 4

In Comparative Example 3, the polyester A before the solid phase polymerization, and polyethylene terephthalate (content of germanium element: 50 ppm, $[\eta]$=0.65, diethylene glycol content: 2% by weight, melting point: 253° C., acetoaldehyde content: 62 ppm, terminal carboxyl groups: 44 equivalents/ton, content of silicon oxide particles: 0.2% by weight) as polyester B were supplied to separate extruders of uniaxial type. The temperature of each extruder was set to the melting point +30° C., and the average dwelling time was about 30 minutes and 25 minutes, respectively. After melting the polyesters, the polyesters were laminated into two layers by using a field block (layer (I) consisting of polyester A/layer (II) consisting of polyester B=1/9) and the resultant was extruded from a conventional die. The extruded sheet was cast on a cooling drum at 20° C. to which static charge was applied such that layer (I) contacts the drum to solidify the sheet. The obtained film was stretched in the longitudinal direction at 90° C. at a stretching ratio of 3.5 times the original length, and then in the transverse direction at a stretching ratio of 3.4 times the original length at 95° C. The resulting film was heat set at 180° C. for 5 seconds while relaxing the film by 5%. A can was prepared from the thus obtained film as in Example 1. The formability and impact resistance were especially deteriorated and satisfactory characteristics were not obtained.

COMPARATIVE EXAMPLE 5

Polybutylene terephthalate copolymerized with 30 mol % of isophthalic acid (content of germanium element: 50 ppm, $[\eta]$=0.90, diethylene glycol content: 0% by weight, melting point: 153° C., amount of carboxyl terminal groups: 24 equivalents/ton) was used as polyester A, and polybutylene terephthalate (content of germanium element: 50 ppm, $[\eta]$= 0.90, diethylene glycol content: 0% by weight, melting point: 221° C., amount of terminal carboxyl groups: 27 equivalents/ton, content of silicon oxide particles: 0.2% by weight) was used as polyester B. Although the obtained film had an excellent impact resistance, since the film has a large amount of butane diol residues and does not contain diethylene glycol component, the taste characteristics were largely deteriorated.

TABLE 1

| | | | Example 1 | Example 2 | Example 3 |
|---|---|---|---|---|---|
| Physical Properties of Polymer | Composition of Layer I | Polyester A | PET/I$^{17.5}$ | PET/I$^{17.5}$ | PET/I$^{17.5}$ |
| | | $[\eta]$ | 0.87 | 0.87 | 0.87 |
| | | Melting Point (°C.) | 213 | 213 | 213 |
| | | DEG Content (wt %) | 0.92 | 0.92 | 0.92 |
| | | Type of Catalyst, Amount (ppm) | Ge, 40 | Ge, 40 | Ge, 40 |
| | | Additives | None | None | Antioxidant |
| | Composition of Layer II | Polyester A | PET/I$^5$ | PET/I$^5$ | PET/I$^5$ |
| | | $[\mu]$ | 0.90 | 0.90 | 0.90 |
| | | Melting Point (°C.) | 240 | 240 | 240 |
| | | DEG Content (wt %) | 0.89 | 0.89 | 0.89 |
| | | Type of Catalyst, Amount (ppm) | Ge, 42 | Ge, 42 | Ge, 42 |
| | | Type of Particles | Silicon Oxide | Silicon Oxide | Silicon Oxide |
| | | Amount of Particles (wt %) | 0.2 | 0.5 | 0.2 |

Note: Abbreviations mean the following:
PET/I: isophthalic acid-copolymerized polyethylene terephthalate (Numbers mean mol % of the copolymerized component.)
DEG: diethylene glycol
Ge: germanium element

TABLE 2

| | | Example 1 | Example 2 | Example 3 |
|---|---|---|---|---|
| Physical Properties of Film | $[\eta]$ | 0.81 | 0.81 | 0.82 |
| | Thicknesses of Layer I/Layer II ($\mu$m) | 27/3 | 27/3 | 27/3 |
| | DEG Content (wt %) | 0.91 | 0.91 | 0.91 |
| | Ge Content (ppm) | Ge, 41 | Ge, 41 | Ge, 41 |
| | Acetoaldehyde Content (ppm) | 12 | 12 | 12 |
| | Terminal Carboxyl Groups (equivalents/ton) | 28 | 28 | 27 |
| | Oligomer Content (wt %) | 0.6 | 0.6 | 0.55 |
| | Average Particle Size ($\mu$m) | 4.0 | 3.0 | 4.0 |
| | Amount of Antioxidant (wt %) | 0 | 0 | 0.03 |
| | Coefficient of Planar Orientation (−) | 0 | 0 | 0 |
| | Surface Wetting Tention (dyne/cm) | 42 | 54 | 42 |
| | Average Roughness Ra ($\mu$m) | 0.018 | 0.017 | 0.018 |

TABLE 2-continued

|  |  | Example 1 | Example 2 | Example 3 |
|---|---|---|---|---|
| | Maximum Roughness Rt (μm) | 0.30 | 0.25 | 0.30 |
| | Rt/Ra (-) | 16.7 | 14.7 | 16.7 |
| Characteristics of Laminate and Can | Adhesive Force (g/cm) | 550(550) | 700(700) | 550(550) |
| | Shapability (mA) | 0.15(0.1) | 0.10(0.07) | 0.15(0.1) |
| | Impact Resistance a (mA) | 0.1(0.1) | 0.08(0.07) | 0.1(0.1) |
| | Impact Resistance b (mA) | 0.15(0.15) | 0.10(0.10) | 0.07(0.07) |
| | Taste Characteristics a (μg/g) | 22(21) | 22(20) | 22(21) |
| | Taste Characteristics b | A(A) | A(A) | A(A) |

Note: Values in parentheses indicate characteristics of laminate TFS and drawn and thin-redrawn can.

TABLE 3

|  |  |  | Example 4 | Example 5 | Example 6 |
|---|---|---|---|---|---|
| Physical Properties of Polymer | Composition of Layer I | Polyester A | PET/I$^{17.5}$ | PET/I$^{17.5}$ | PET/I$^{16}$ |
| | | [η] | 0.85 | 0.80 | 0.90 |
| | | Melting Point (°C.) | 213 | 213 | 218 |
| | | DEG Content (wt %) | 0.92 | 0.92 | 0.53 |
| | | Type of Catalyst, Amount (ppm) | Ge, 40 | Ge, 40 | Sb, 40 |
| | | Additives | Antioxidant | None | None |
| | Composition of Layer II | Polyester A | PET/I$^5$ | PET/I$^5$ | PET/I$^6$ |
| | | [μ] | 0.90 | 0.80 | 0.88 |
| | | Melting Point (°C.) | 240 | 240 | 244 |
| | | DEG Content (wt %) | 0.89 | 0.89 | 0.80 |
| | | Type of Catalyst, Amount (ppm) | Ge, 42 | Ge, 42 | Ge, 45 |
| | | Type of Particles | Silicon Oxide | Silicon Oxide | Cross-linked Polystyrene |
| | | Amount of Particles (wt %) | 0.2 | 0.2 | 0.2 |

Note: Abbreviations mean the following:
PET/I: isophthalic acid-copolymerized polyethylene terephthalate (Numbers mean mol % of the copolymerized component.)
DEG: diethylene glycol
Ge: germanium element
Sb: antimony element

TABLE 4

|  |  | Example 4 | Example 5 | Example 6 |
|---|---|---|---|---|
| Physical Properties of Film | [η] | 0.80 | 0.72 | 0.82 |
| | Thicknesses of Layer I/Layer II (μm) | 27/3 | 27/3 | 24/6 |
| | DEG Content (wt %) | 0.91 | 0.91 | 0.61 |
| | Ge Content (ppm) | Ge, 41 | Ge, 41 | Ge, 4 |
| | Acetoaldehyde Content (ppm) | 12 | 14 | 19 |
| | Terminal Carboxyl Groups (equivalents/ton) | 29 | 28 | 28 |
| | Oligomer Content (wt %) | 0.7 | 0.5 | 0.5 |
| | Average Particle Size (μm) | 4.0 | 4.0 | 3.0 |
| | Amount of Antioxidant (wt %) | 1.2 | 0 | 0 |
| | Coefficient of Planar Orientation (-) | 0 | 0 | 0 |
| | Surface Wetting Tention (dyne/cm) | 42 | 42 | 42 |
| | Average Roughness Ra (μm) | 0.018 | 0.018 | 0.020 |
| | Maximum Roughness Rt (μm) | 0.30 | 0.30 | 0.25 |
| | Rt/Ra (-) | 16.7 | 16.7 | 12.5 |
| Characteristics of | Adhesive Force (g/cm) | 450(450) | 550(550) | 550(550) |
| | Shapability (mA) | 0.17(0.15) | 0.16(0.12) | 0.05(0.05) |
| Laminate and Can | Impact Resistance a (mA) | 0.18(0.15) | 0.18(0.15) | 0.08(0.07) |
| | Impact Resistance b (mA) | 0.16(0.17) | 0.19(0.18) | 0.13(0.11) |
| | Taste Characteristics a (μ/g) | 40(37) | 29(28) | 20(19) |
| | Taste Characteristics b | B(B) | A(A) | A(A) |

Note: Values in parentheses indicate characteristics of laminate TFS and drawn and thin-redrawn can.
DEG: diethelenyl glycol
Ge: germamium element

TABLE 5

| | | | Example 7 | Example 8 | Example 9 |
|---|---|---|---|---|---|
| Physical Properties of Polymer | Composition of Layer I | Polyester A | PET/I[16] | PET/I[17.5] | PET/I[17.5] |
| | | [η] | 0.90 | 0.87 | 0.87 |
| | | Melting Point (°C.) | 218 | 213 | 213 |
| | | DEG Content (wt %) | 0.53 | 0.92 | 0.92 |
| | | Type of Catalyst, Amount (ppm) | Sb, 40 | Ge, 40 | Ge, 40 |
| | | Additives | None | None | PBT/I[30] |
| | Composition of Layer II | Polyester A | PET/I[3] | PET/I[5] | PET/I[5] |
| | | [μ] | 0.88 | 0.90 | 0.90 |
| | | Melting Point (°C.) | 244 | 240 | 240 |
| | | DEG Content (wt %) | 0.80 | 0.89 | 0.89 |
| | | Type of Catalyst, Amount (ppm) | Ge, 45 | Ge, 42 | Ge, 42 |
| | | Type of Particles | Cross-linked Polystyrene | Silicon Oxide | Silicon Oxide |
| | | Amount of Particles (wt %) | 0.2 | 0.2 | 0.2 |

Note: Abbreviations mean the following:
PET/I: isophthalic acid-copolymerized polyethylene terephthalate (Numbers mean mol % of the copolymerized component.)
PBT/I: isophthalic acid-copolymerized polybutylene terephthalate (Numbers mean mol % of the copolymerized component.)
DEG: diethylene glycol
Ge: germanium element
Sb: antimony element

TABLE 6

| | | Example 7 | Example 8 | Example 9 |
|---|---|---|---|---|
| Physical Properties of Film | [η] | 0.82 | 0.81 | 0.81 |
| | Thicknesses of Layer I/Layer II (μm) | 24/6 | 27/3 | 27/3 |
| | DEG Content (wt %) | 0.61 | 0.91 | 0.83 |
| | Ge Content (ppm) | Ge, 4 | Ge, 41 | Ge, 38 |
| | Acetoaldehyde Content (ppm) | 19 | 10 | 14 |
| | Terminal Carboxyl Groups (equivalents/ton) | 28 | 28 | 30 |
| | Oligomer Content (wt %) | 0.5 | 0.6 | 0.6 |
| | Average Particle Size (μm) | 3.0 | 4.0 | 4.0 |
| | Amount of Antioxidant (wt %) | 0 | 0 | 0 |
| | Coefficient of Planar Orientation (-) | 0 | 0.09 | 0 |
| | Surface Wetting Tention (dyne/cm) | 42 | 42 | 42 |
| | Average Roughness Ra (μm) | 0.020 | 0.025 | 0.018 |
| | Maximum Roughness Rt (μm) | 0.25 | 0.28 | 0.30 |
| | Rt/Ra (-) | 12.5 | 11.2 | 16.7 |
| Characteristics of Laminate and Can | Adhesive Force (g/cm) | 550(550) | 400(550) | 600(600) |
| | Shapability (mA) | 0.14(0.1) | 0.19(0.1) | 0.09(0.07) |
| | Impact Resistance a (mA) | 0.1(0.1) | 0.11(0.09) | 0.09(0.07) |
| | Impact Resistance b (mA) | 0.15(0.15) | 0.16(0.14) | 0.10(0.07) |
| | Taste Characteristics a (μg/g) | 22(21) | 20(19) | 22(21) |
| | Taste Characteristics b | A(A) | A(A) | A(A) |

Note: Values in parentheses indicate characteristics of laminate TFS and drawn and thin-redrawn can.
DEG: diethelent glycol
Ge: germamium element

TABLE 7

| | | | Example 10 | Example 11 | Example 12 |
|---|---|---|---|---|---|
| Physical Properties of Polymer | Composition of Layer I | Polyester A | PET/I[17.5] | PET/I[17.5] | PET/I[17.5] |
| | | [η] | 0.87 | 0.87 | 0.87 |
| | | Melting Point (°C.) | 213 | 213 | 213 |
| | | DEG Content (wt %) | 0.92 | 0.92 | 0.92 |
| | | Type of Catalyst, Amount (ppm) | Ge, 40 | Ge, 40 | Ge, 40 |
| | | Additives | None | None | None |
| | Composition of Layer II | Polyester A | PET/I[5] | PET/I[5] | PET/I[5] |
| | | [μ] | 0.90 | 0.90 | 0.90 |
| | | Melting Point (°C.) | 240 | 240 | 240 |
| | | DEG Content (wt %) | 0.89 | 0.89 | 0.53 |
| | | Type of Catalyst, Amount (ppm) | Ge, 42 | Ge, 42 | Sb, 300 |
| | | Type of Particles | Silicon Oxide | Silicon Oxide | Silicon Oxide |
| | | Amount of Particles (wt %) | 0.2 | 0.2 | 0.2 |

Note: Abbreviations mean the following:
PET/I: isophthalic acid-copolymerized polyethylene terephthalate (Numbers mean mol % of the copolymerized component.)
DEG: diethylene glycol
Ge: germanium element

TABLE 8

| | | Example 10 | Example 11 | Example 12 |
|---|---|---|---|---|
| Physical Properties of Film | [η] | 0.73 | 0.72 | 0.81 |
| | Thicknesses of Layer I/Layer II (μm) | 27/3 | 27/3 | 27/3 |
| | DEG Content (wt %) | 0.91 | 0.91 | 0.88 |
| | Ge Content (ppm) | Ge, 41 | Ge, 41 | Ge, 36 |
| | Acetoaldehyde Content (ppm) | 19 | 37 | 14 |
| | Terminal Carboxyl Groups (equivalents/ton) | 34 | 51 | 29 |
| | Oligomer Content (wt %) | 0.6 | 0.7 | 0.5 |
| | Average Particle Size (μm) | 4.0 | 4.0 | 4.0 |
| | Amount of Antioxidant (wt %) | 0 | 0 | 0 |
| | Coefficient of Planar Orientation (–) | 0 | 0 | 0 |
| | Surface Wetting Tention (dyne/cm) | 42 | 42 | 42 |
| | Average Roughness Ra (μm) | 0.018 | 0.018 | 0.018 |
| | Maximum Roughness Rt (μm) | 0.30 | 0.30 | 0.30 |
| | Rt/Ra (–) | 16.7 | 16.7 | 16.7 |
| Characteristics of Laminate and Can | Adhesive Force (g/cm) | 450(450) | 550(550) | 550(550) |
| | Shapability (mA) | 0.20(0.18) | 0.15(0.1) | 0.15(0.1) |
| | Impact Resistance a (mA) | 0.17(0.15) | 0.14(0.12) | 0.08(0.07) |
| | Impact Resistance b (mA) | 0.20(0.17) | 0.19(0.18) | 0.12(0.11) |
| | Taste Characteristics a (μg/g) | 22(21) | 33(31) | 35(32) |
| | Taste Characteristics b | A(A) | B(B) | A(A) |

Note: Values in parentheses indicate characteristics of laminate TFS and drawn and thin-redrawn can.
DEG: diethylene glycol
Ge: germamium element

TABLE 10

| | | Example 13 | Example 14 | Example 15 |
|---|---|---|---|---|
| Physical Properties of Film | [η] | 0.81 | 0.81 | 0.81 |
| | Thicknesses of Layer I/Layer II (μm) | 15/15 | 27/3 | 27/3 |
| | DEG Content (wt %) | 0.91 | 0.91 | 0.91 |
| | Ge Content (ppm) | Ge, 41 | Ge, 41 | Ge, 41 |
| | Acetoaldehyde Content (ppm) | 14 | 12 | 12 |
| | Terminal Carboxyl Groups (equivalents/ton) | 28 | 28 | 28 |
| | Oligomer Content (wt %) | 0.6 | 0.6 | 0.6 |
| | Average Particle Size (μm) | 4.0 | 4.0 | 2.5 |
| | Amount of Antioxidant (wt %) | 0 | 0 | 0 |
| | Coefficient of Planar Orientation (–) | 0 | 0 | 0 |
| | Surface Wetting Tention (dyne/cm) | 42 | 42 | 42 |
| | Average Roughness Ra (μm) | 0.020 | 0.018 | 0.012 |
| | Maximum Roughness Rt (μm) | 0.30 | 0.30 | 0.12 |
| | Rt/Ra (–) | 15.0 | 16.7 | 10.0 |
| Characteristics of Laminate and Can | Adhesive Force (g/cm) | 550(550) | 500(500) | 550(550) |
| | Shapability (mA) | 0.17(0.13) | 0.15(0.1) | 0.09(0.08) |
| | Impact Resistance a (mA) | 0.14(0.13) | 0.09(0.08) | 0.1(0.1) |
| | Impact Resistance b (mA) | 0.17(0.16) | 0.14(0.13) | 0.15(0.15) |
| | Taste Characteristics a (μg/g) | 22(21) | 22(21) | 28(25) |
| | Taste Characteristics b | A(A) | A(A) | A(A) |

Note: Values in parentheses indicate characteristics of laminate TFS and drawn and thin-redrawn can.

TABLE 9

| | | | Example 13 | Example 14 | Example 15 |
|---|---|---|---|---|---|
| Physical Properties of Polymer | Composition of Layer I | Polyester A | PET/I$^{17.5}$ | PET/I$^{17.5}$ | PET/I$^{17.5}$ |
| | | [η] | 0.87 | 0.87 | 0.87 |
| | | Melting Point (°C.) | 213 | 213 | 213 |
| | | DEG Content (wt %) | 0.92 | 0.92 | 0.92 |
| | | Type of Catalyst, Amount (ppm) | Ge, 40 | Ge, 40 | Ge, 40 |
| | | Additives | None | None | None |
| | Composition of Layer II | Polyester A | PET/I$^5$ | PET/I$^5$ | PET/I$^5$ |
| | | [μ] | 0.90 | 0.90 | 0.90 |
| | | Melting Point (°C.) | 240 | 240 | 240 |
| | | DEG Content (wt %) | 0.89 | 0.89 | 0.89 |
| | | Type of Catalyst, Amount (ppm) | Ge, 42 | Ge, 42 | Ge, 42 |
| | | Type of Particles | Silicon Oxide | Silicon Oxide | Non-incorporated Particles |
| | | Amount of Particles (wt %) | 0.2 | 0.2 | 0.45 |

Note: Abbreviations mean the following:
PET/I: isophthalic acid-copolymerized polyethylene terephthalate (Numbers mean mol % of the copolymerized component.)
DEG: diethylene glycol
Ge: germanium element

TABLE 11

|  |  |  | Comparative Example 1 | Comparative Example 2 | Comparative Example 3 |
|---|---|---|---|---|---|
| Physical Properties of Polymer | Composition of Layer I | Polyester A | PET/I$^{17.5}$ | PET/I$^{17.5}$ | PET/I$^{17.5}$ |
|  |  | [η] | 0.68 | 0.68 | 0.85 |
|  |  | Melting Point (°C.) | 214 | 214 | 213 |
|  |  | DEG Content (wt %) | 0.92 | 0.92 | 1.6 |
|  |  | Type of Catalyst, Amount (ppm) | Ge, 40 | Ge, 40 | Ge, 40 |
|  |  | Additives | None | None | None |
|  | Composition of Layer II | Polyester A | PET/I$^5$ | PET/I$^5$ | PET/I$^5$ |
|  |  | [μ] | 0.64 | 0.90 | 0.86 |
|  |  | Melting Point (°C.) | 241 | 240 | 240 |
|  |  | DEG Content (wt %) | 0.89 | 0.89 | 1.6 |
|  |  | Type of Catalyst, Amount (ppm) | Ge, 42 | Ge, 42 | Ge, 42 |
|  |  | Type of Particles | Silicon Oxide | Silicon Oxide | Silicon Oxide |
|  |  | Amount of Particles (wt %) | 0.2 | 0.5 | 0.2 |

Note: Abbreviations mean the following:
PET/I: isophthalic acid-copolymerized polyethylene terephthalate (Numbers mean mol % of the copolymerized component.)
DEG: diethylene glycol
Ge: germanium element

TABLE 12

|  |  | Comparative Example 1 | Comparative Example 2 | Comparative Example 3 |
|---|---|---|---|---|
| Physical Properties of Film | [η] | 0.65 | 0.67 | 0.82 |
|  | Thicknesses of Layer I/ Layer II (μm) | 27/3 | 27/3 | 27/3 |
|  | DEG Content (wt %) | 0.91 | 0.91 | 1.6 |
|  | Ge Content (ppm) | Ge, 41 | Ge, 41 | Ge, 41 |
|  | Acetoaldehyde Content (ppm) | 23 | 22 | 55 |
|  | Terminal Carboxyl Groups (equivalents/ton) | 41 | 39 | 42 |
|  | Oligomer Content (wt %) | 0.9 | 0.9 | 0.7 |
|  | Average Particle Size (μm) | 4.0 | 4.0 | 4.0 |
|  | Amount of Antioxidant (wt %) | 0 | 0 | 0 |
|  | Coefficient of Planar Orientation (-) | 0 | 0 | 0 |
|  | Surface Wetting Tention (dyne/cm) | 42 | 42 | 42 |
|  | Average Roughness Ra (μm) | 0.018 | 0.018 | 0.018 |
|  | Maximum Roughness Rt (μm) | 0.30 | 0.30 | 0.30 |
|  | Rt/Ra (-) | 16.7 | 16.7 | 16.7 |
| Characteristics of Laminate and Can | Adhesive Force (g/cm) | 550(550) | 550(550) | 550(550) |
|  | Shapability (mA) | 0.25(0.22) | 0.25(0.21) | 0.21(0.20) |
|  | Impact Resistance a (mA) | 0.6(0.5) | 0.5(0.4) | 0.9(0.8) |
|  | Impact Resistance b (mA) | 1.5(1.1) | 1.4(1.1) | 2.1(1.9) |
|  | Taste Characteristics a (μg/g) | 32(29) | 24(22) | 22(21) |
|  | Taste Characteristics b | C(C) | C(C) | C(C) |

Note: Values in parentheses indicate characteristics of laminate TFS and drawn and thin-redrawn can.
DEG: diethylene glycol
Ge: germamium element

TABLE 13

|  |  |  | Comparative Example 4 | Comparative Example 5 |
|---|---|---|---|---|
| Physical Properties of Polymer | Composition of Layer I | Polyester A | PET/I$^{17.5}$ | PBT/I$^{30}$ |
|  |  | [η] | 0.67 | 0.90 |
|  |  | Melting Point (°C.) | 213 | 153 |
|  |  | DEG Content (wt %) | 1.6 | 0 |
|  |  | Type of Catalyst, Amount (ppm) | Ge, 40 | Ge, 50 |
|  |  | Additives | None | None |
|  | Composition of Layer II | Polyester A | PET | PBT |
|  |  | [η] | 0.65 | 0.90 |
|  |  | Melting Point (°C.) | 253 | 221 |
|  |  | DEG Content (wt %) | 2.0 | 0 |
|  |  | Type of Catalyst, Amount (ppm) | Ge, 50 | Ge, 50 |
|  |  | Type of Particles | Silicon Oxide | Silicon Oxide |
|  |  | Amount of Particles (wt %) | 0.2 | 0.2 |

Note: Abbreviations mean the following:
PET/I: isophthalic acid-copolymerized polyethylene terephthalate (Numbers mean mol % of the copolymerized component.)
DEG : diethylene glycol
Ge: germanium element

TABLE 14

|  |  | Comparative Example 4 | Comparative Example 5 |
|---|---|---|---|
| Physical Properties of Film | [β] | 0.64 | 0.83 |
|  | Thicknesses of Layer I/ Layer II (μm) | 3/27 | 27/3 |
|  | DEG Content (wt %) | 1.96 | 0 |
|  | Ge Content (ppm) | Ge, 49 | Ge, 50 |
|  | Acetoaldehyde Content (ppm) | 43 | 29 |
|  | Terminal Carboxyl Groups (equivalents/ton) | 48 | 31 |
|  | Oligomer Content (wt %) | 0.9 | — |
|  | Average Particle Size (μm) | 4.0 | 4.0 |
|  | Amount of Antioxidant | 0 | 0 |

TABLE 14-continued

|  |  | Comparative Example 4 | Comparative Example 5 |
|---|---|---|---|
|  | (wt %) Coefficient of Planar Orientation (-) | 0.11 | 0 |
|  | Surface Wetting Tention (dyne/cm) | 42 | 39 |
|  | Average Roughness Ra (μm) | 0.022 | 0.017 |
|  | Maximum Roughness Rt (μm) | 0.25 | 0.25 |
|  | Rt/Ra (-) | 11.4 | 14.7 |
| Characteristics of Laminate and Can | Adhesive Force (g/cm) | 500(500) | 600(600) |
|  | Shapability (mA) | 0.32(0.25) | 0.12(0.11) |
|  | Impact Resistance a (mA) | 0.7(0.6) | 0.10(0.08) |
|  | Impact Resistance b (mA) | 1.4(1.2) | 0.10(0.08) |
|  | Taste Characteristics a (μm) | 34(33) | 217(200) |
|  | Taste Characteristics b | B(B) | C(C) |

Note: Values in parentheses indicate characteristics of laminate TFS and drawn and thin-redrawn can.
DEG: diethylene glycol
Ge: germamium element

INDUSTRIAL AVAILABILITY

The polyester film for thermal lamination according to the present invention has excellent formability, adhesiveness, impact resistance and taste characteristics when used after thermally laminated on a substrate. Therefore, the polyester film may suitably be used as a wrapping material of foods and a liner of beverage containers. Especially, the laminate metal plate comprising a substrate made of a metal may suitably be used for forming metal cans produced by various forming methods.

Further, laminate materials excelling in taste characteristics, impact resistance and formability, which hitherto could not be attained are obtained using a substrate made of a non-metal such as paper, plastics, fibers, and non-woven fabrics. These laminate materials may suitably be used as a container, can or other wrapping materials.

We claim:

1. A method for thermally laminating a substrate with a polyester film, said method comprising contacting said substrate with said polyester film under heat, wherein said film has a melting point of 150–250° C., contains 0.01–1% by weight of diethylene glycol component and not more than 0.8% by weight of cyclic trimers and has an intrinsic viscosity (η) of not less than 0.7.

2. The method of claim 1, wherein said film has an intrinsic viscosity (η) of not less than 0.8.

3. The method as claimed in claim 1 or 2, wherein said film contains 1–500 ppm of germanium.

4. The method as claimed in claim 1 or 2, wherein said film has terminal carboxyl groups in an amount of not more than 45 equivalents/ton.

5. The method as claimed in claim 1 or 2, wherein said film is a multi-layer film comprising a layer (I) containing not less than 70% by weight polyester A having a melting point of 150–230° C. and a layer (II) containing not less than 70% weight polyester B having a melting point of 220–250° C., said layers (I) and (II) being laminated.

6. The method to claim 5, wherein said polyester A has an intrinsic viscosity (η) of not less than 0.7.

7. The method as claimed in claim 1 or 2, wherein said film has a coefficient of planar orientation fn of 0–0.12, wherein fn=(Nx+Ny)/2−Nz and Nx, Ny, and Nz are refractive indices in longitudinal, transverse, and thickness directions, respectively.

8. The method as claimed in claim 1 or 2, wherein at least one surface of said film has an average roughness Ra of 0.001–1 μm, and a ratio RT/Ra of maximum surface height RT to the average roughness Ra of 3–60.

9. The method as claimed in claim 1 or 2, wherein at least one surface of said film has a surface wetting tension of not less than 45 dynes/cm.

10. The method as claimed in claim 1 or 2, wherein said film has at least two melting point peaks within a range between 150° C. and 230° C.

11. The method as claimed in claim 1 or 2, wherein said film contains 0.001–1% by weight of an antioxidant.

12. The method as claimed in claim 1 or 2, wherein said film is laminated on a substrate selected from the group consisting of steel plates, aluminum plates and surface-treated plates thereof.

* * * * *